United States Patent
Olsen et al.

(10) Patent No.: US 11,432,672 B2
(45) Date of Patent: Sep. 6, 2022

(54) DISPOSABLE CURTAIN SYSTEM, ATTACHMENT THEREFOR AND METHOD

(71) Applicant: Bannack Medical LLC, Gilbert, AZ (US)

(72) Inventors: Arlen Olsen, Clifton Park, NY (US); Walter Balfour, Tempe, AZ (US)

(73) Assignee: BANNACK MEDICAL LLC, Gilbert, AZ (US)

( * ) Notice: Subject to any disclaimer, the term of this patent is extended or adjusted under 35 U.S.C. 154(b) by 0 days.

(21) Appl. No.: 16/933,545

(22) Filed: Jul. 20, 2020

(65) Prior Publication Data
US 2022/0015565 A1    Jan. 20, 2022

(51) Int. Cl.
A47H 15/02    (2006.01)
A47H 1/06    (2006.01)

(52) U.S. Cl.
CPC ............. *A47H 15/02* (2013.01); *A47H 1/06* (2013.01)

(58) Field of Classification Search
CPC ........ A47H 15/00; A47H 15/02; A47H 15/04; A47H 13/00; A47H 13/01; A47H 13/02; A47H 13/04; Y10T 16/35; Y10T 16/353; Y10T 16/372; Y10T 16/375; Y10T 16/378; Y10T 16/3797
See application file for complete search history.

(56) References Cited

U.S. PATENT DOCUMENTS

| | | | |
|---|---|---|---|
| 948,687 A | 2/1910 | Kirkbride | |
| 1,472,766 A * | 10/1923 | Fraser | A47H 13/04 16/87.2 |
| 2,544,516 A * | 3/1951 | Walters | A47H 13/14 160/348 |
| 2,594,605 A | 4/1952 | Zoppelt | |
| 2,968,205 A | 1/1961 | Springate | |

(Continued)

FOREIGN PATENT DOCUMENTS

| CH | 657511 A5 | 9/1986 |
|---|---|---|
| EP | 2428142 A2 | 3/2012 |

(Continued)

OTHER PUBLICATIONS

InControl—SmartGuard Disposable Privacy Curtains; ttp://globalmedics.co.nz/media//InControl_SmartGuard_Brochure_2.pdf. 12 Pages.

(Continued)

*Primary Examiner* — Johnnie A. Shablack
(74) *Attorney, Agent, or Firm* — Schmeiser, Olsen & Watts LLP

(57) ABSTRACT

Disclosed is a disposable curtain system, attachment therefor and method. The disposable curtain system is for use in health care facilities to maintain a clean environment. An attachment for a curtain system having a hook on a track. The hook has a first end affixed to a sliding member, wherein the sliding member slides along the track. A shank extends from the sliding member. The hook has a bend extending from the shank, wherein the a curtain hangs from the bend by gravity when in use; and a point extending from the bend. The attachment has a cover having a first section covering a point, a second section of the cover, covering at least a portion of a shank, and a third section of the cover, covering a portion of a gap between the shank and the point.

20 Claims, 4 Drawing Sheets

(56) References Cited

U.S. PATENT DOCUMENTS

| | | | |
|---|---|---|---|
| 3,191,665 A | 6/1965 | Rosenbaum et al. | |
| D208,302 S | 8/1967 | Romano | |
| 3,645,318 A * | 2/1972 | Holzlehner | A47H 13/14 160/348 |
| 3,712,509 A * | 1/1973 | Niel | A47H 13/04 221/197 |
| 4,282,630 A | 8/1981 | Toder | |
| 4,359,080 A * | 11/1982 | Brydolf | E05D 15/26 160/183 |
| 5,217,057 A * | 6/1993 | Hubbard | A47H 5/00 160/123 |
| D337,516 S | 7/1993 | Williams | |
| 6,000,456 A * | 12/1999 | Neverett | E06B 9/362 160/177 V |
| 6,564,851 B1 * | 5/2003 | Liao | A47H 13/00 16/87.4 R |
| D475,231 S | 6/2003 | Briles | |
| 6,595,478 B2 | 7/2003 | Lee | |
| 6,938,927 B1 | 9/2005 | Martin et al. | |
| 7,100,661 B1 | 9/2006 | Pittman | |
| D534,415 S | 1/2007 | Salice | |
| 7,370,839 B2 | 5/2008 | Putman | |
| D633,373 S | 3/2011 | Grenade | |
| D654,347 S | 2/2012 | Chen | |
| D654,349 S | 2/2012 | Schopf | |
| D678,042 S | 3/2013 | Jacobson | |
| 8,397,346 B2 | 3/2013 | Peters et al. | |
| 8,479,800 B2 | 7/2013 | Graneto, III et al. | |
| 8,899,301 B2 * | 12/2014 | Graneto, III | A47H 11/02 160/341 |
| D737,126 S | 8/2015 | Tschan | |
| 9,204,749 B1 | 12/2015 | Trapani | |
| 9,480,357 B2 * | 11/2016 | Price | A47H 15/02 |
| 9,585,508 B2 | 3/2017 | Graneto, III | |
| 10,398,248 B1 * | 9/2019 | Burch, Jr. | A47H 13/04 |
| 10,758,072 B2 * | 9/2020 | Hatton | A47H 13/04 |
| 10,945,548 B2 * | 3/2021 | Wexler | A47H 1/142 |
| 2006/0001254 A1 | 1/2006 | Malone | |
| 2007/0012346 A1 | 1/2007 | Choi | |
| 2007/0157505 A1 * | 7/2007 | Dodge | A01K 97/06 43/25.2 |
| 2010/0139873 A1 | 6/2010 | Gardner | |
| 2011/0061819 A1 * | 3/2011 | Elinson | A47H 21/00 160/196.1 |
| 2011/0283479 A1 | 11/2011 | Peters et al. | |
| 2012/0018106 A1 | 1/2012 | Robledo | |
| 2013/0047331 A1 | 2/2013 | Parker et al. | |
| 2015/0208843 A1 * | 7/2015 | Ruble | A47H 13/04 24/373 |
| 2016/0037953 A1 * | 2/2016 | Price | A47H 15/02 160/341 |
| 2016/0374496 A1 * | 12/2016 | Marcinik | A47H 1/08 160/331 |
| 2017/0273492 A1 | 9/2017 | Hatton et al. | |
| 2018/0020860 A1 | 1/2018 | Thomas | |
| 2018/0279818 A1 | 10/2018 | Goelst | |

FOREIGN PATENT DOCUMENTS

| | | | |
|---|---|---|---|
| EP | 3308680 A2 | 4/2018 | |
| GB | 2358123 A | 7/2001 | |
| GB | 2385511 A | 8/2003 | |
| GB | 2457075 B | 10/2011 | |
| GB | 2489485 A | 10/2012 | |
| GB | 2493773 A | 2/2013 | |
| KR | 101895219 B1 | 2/1910 | |
| TW | M587965 U | 12/2019 | |

OTHER PUBLICATIONS

Marlux Disposable Hospital Curtains: https://www.marluxmedical.com/disposable-curtains. 8 pages.

Opal Health Disposible Curtains Quick Fit System, May 26, 2017. https://www.youtube.com/watch?v=XsQnyL-REhY.

Opalhealth: The Fast, hygienic alternative to traditional curtains, https://opalhealth.co.uk/benefits/. 4 pages.

Solent Blinds & Curtains: Disposable Curtains: https://solentblinds.co.uk/commercial/products/disposable-curtains/. 1 page.

EasyClick: "The Next Generation of Disposable Curtains", https://behrens.co.uk/product/easyclick-the-next-generation-of-disposable-curtains/. 2 pages.

Installing Locking Button in Telescoping Tube, Jul. 29, 2014. https://www.youtube.com/watch?v=y3V6o3eca0g.

Halder: Ball Lock Pins self-locking, with T-handle. https://www.halder.com/eng/Products/Standard-Parts/Machine-and-Fixture-Elements/Ball-Lock-Pins/Ball-Lock-Pins-self-locking-with-T-handle. 2 pages.

Rapid Refresh Shower Curtains. https://www.icpmedical.com/docs/product-sheets/Shower-Curtains-RR.pdf. 1 page.

ICP Medical: Privacy Curtains: https://icpmedical.com/docs/product-sheets/Privacy-Curtains-RR.pdf. 2 pages.

EasyClick Disposable Cubicle Curtains. https://behrens.co.uk/media/EASYCLICK-advert.jpg; 1 page.

EasyKlip Instructions. Retrieved from https://www.curtain-tracks.com/610-easyklip-mini-tarp-clip-10-per-pack.html. 1 page.

EasyKlip Midi Tarp & Banner Clip, https://www.curtain-tracks.com/610-easyklip-mini-tarp-clip-10-per-pack.html. 2 pages.

"Halder Ball Lock Pins", Oct. 23, 2017. https://youtu.be/qLTZiNngk9c.

ICP Medical: Privacy Curtains: https://www.icpmedical.com/Products/Privacy-Curtains. 2 pages.

"Installing the ICP Medical Rapid Refresh Privacy Curtain", Jun. 10, 2014. https://www.youtube.com/embed/azsr7bpMB5U?autoplay=1.

"Installing the ICP Medical Rapid Refresh Curtain Rods", Jun. 10, 2014. https://www.youtube.com/embed/lohmn8UhiRo?autoplay=1.

Hasan, Afzal. Patentability Search Report for Disposable Curtain System, dated Jul. 6, 2020.

PCT International Search Report & Written Opinion dated Jan. 5, 2022 corresponding to PCT International Application No. PCT/US2021/046604.

PCT International Search Report & Written Opinion dated Jan. 27, 2022 corresponding to PCT International Application No. PCT/US21/55740.

Notice of Allowance (dated Mar. 9, 2022) for U.S. Appl. No. 29/755,246, filed Oct. 19, 2020.

Notice of Allowance (dated Mar. 9, 2022) for U.S. Appl. No. 29/755,256, filed Oct. 19, 2020.

Notice of Allowance (dated Mar. 9, 2022) for U.S. Appl. No. 29/755,257, filed Oct. 19, 2020.

* cited by examiner

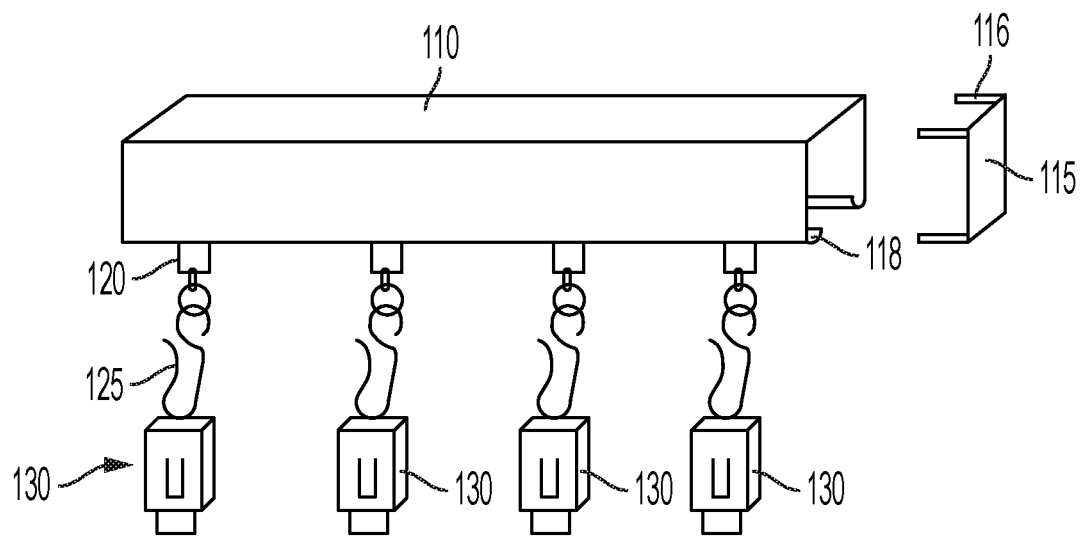
FIG. 2
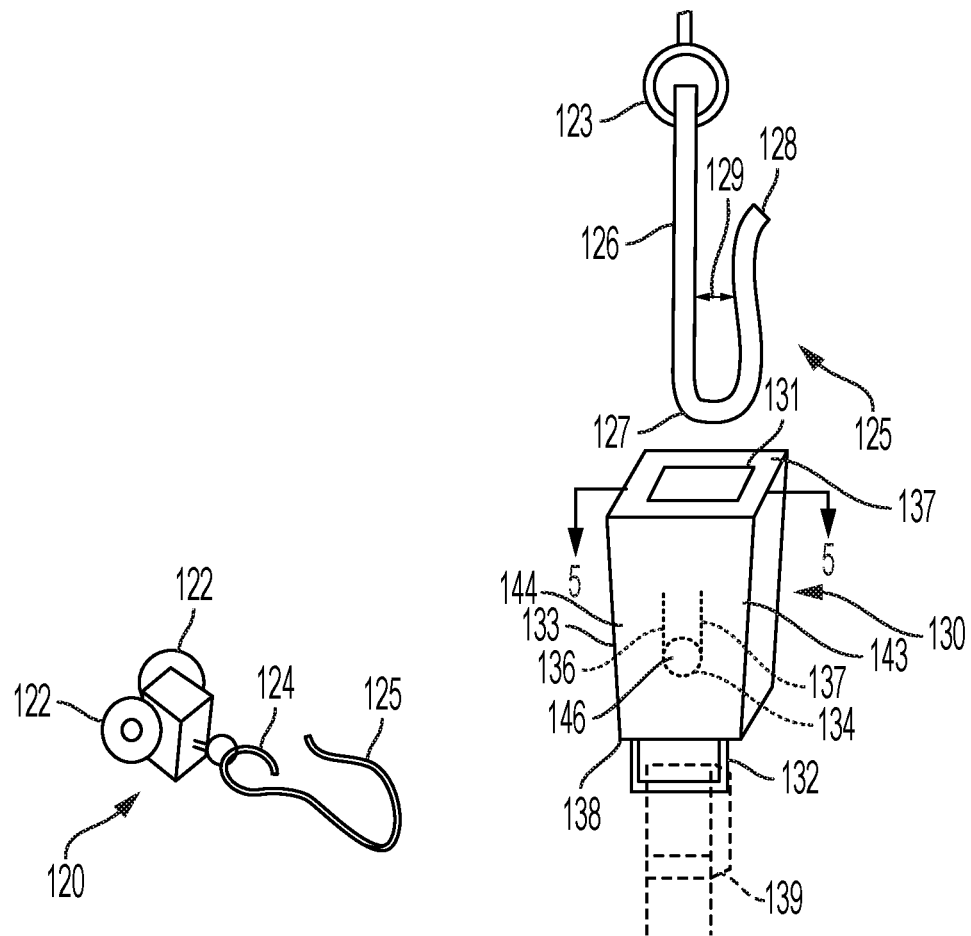
FIG. 3
FIG. 4

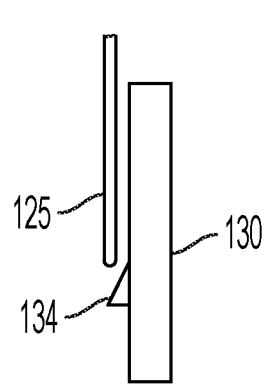
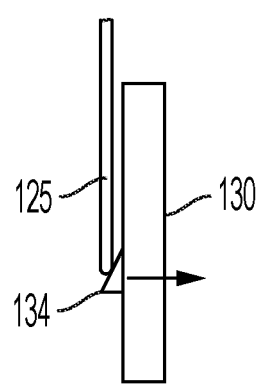
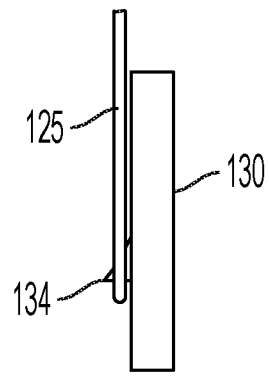
FIG. 5A  FIG. 5B  FIG. 5C
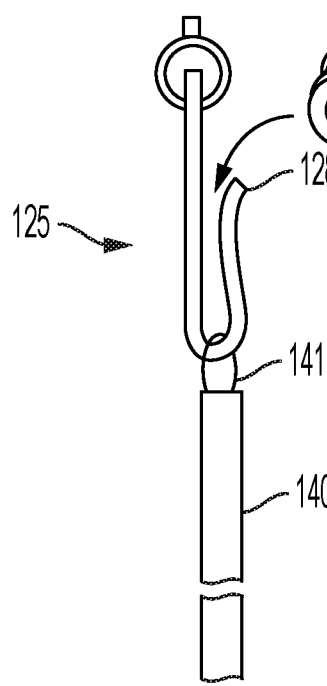
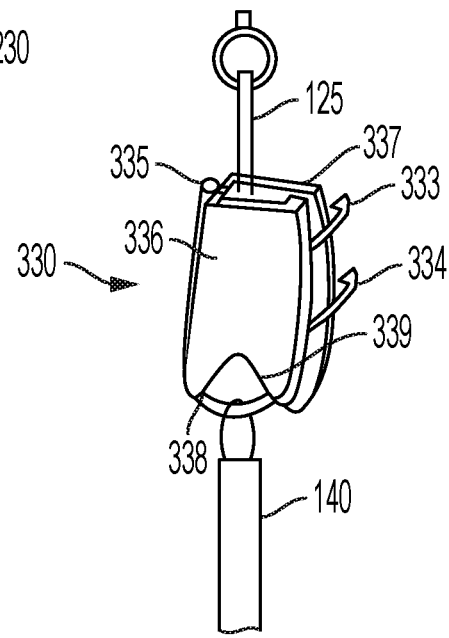
FIG. 6  FIG. 7

DISPOSABLE CURTAIN SYSTEM, ATTACHMENT THEREFOR AND METHOD

Disclosed is a disposable curtain system, attachment therefor and method. In particular, is a disposable curtain system for use in health care facilities to maintain a clean environment.

BACKGROUND

Hospitals are becoming more and more concerned with infectious diseases being present in the hospital. The COVID-19 pandemic is one major infectious disease that has brought attention to the public by the media to the concerns of cleanliness of health care facilities such as hospitals, nursing homes, long term care facilities and other public spaces. In addition to COVID-19 are other infections diseases such as bacterial infection diseases like Anthrax, bacterial botulism, brucellosis, cholera, diphtheria, Lyme's disease, tuberculosis; fungal infectious diseases like aspergillosis, blastomycosis, candidiasis, cryptococcosis, histoplasmosis; parasitic infectious diseases like ascariasis, cryptosporidiosis, giardiasis, malaria, scabies; prion infectious diseases like Alper's syndrome, Creutzfeldt-Jakob disease, kuru; and viral infectious diseases like COVID-19, AIDS, Chickenpox, Common Cold, Ebola, Herpes, Influenza, Mumps, Rabies, Rubella, Viral meningitis, Yellow fever and many more.

One location in the hospital that has a concern with infectious disease are the privacy curtains. Medical personnel will take many precautions such as washing hands, wearing gloves and wearing personal protection equipment. However while wearing gloves they will grab the curtains with their gloved hands which may leave infectious diseases on the curtains due to contact with bodily fluids such as blood, saliva, urine, mucous, phlegm, etc. In addition, patients which are surrounded by the curtain systems will cough, sneeze or perform other bodily functions which expel airborne liquids into the air surrounding their bed or private space.

Curtain systems for hospitals are generally attached to the ceiling. The curtains systems have a track which is affixed to the ceiling. Within the track are rollers with hooks. The curtains attach to the hooks.

A difficulty with this system is that the tracks and hooks are attached to ceilings that can be from seven to 12 feet above the ceiling. This requires maintenance personnel at the hospital to use ladders or other stools to replace the curtains.

A further difficulty is when replacing the curtain system, the roller hooks in the track many times need to be crimped causing repetitive problems with the installer having problems with muscles and tendons due to repetitive installation of the curtains on the hooks.

Another difficulty is that the most curtain systems are not easily and quickly disassembled and require personnel to remove the curtains one hook at a time.

SUMMARY

Disclosed is a disposable curtain system, attachment therefor and method. An advantage is the ability to quickly attach a disposable curtain system to hooks on a pre-existing or installed curtain system.

Another advantage is once installed, there will be no need for health care personnel to climb on ladders or stools to reach the hooks for replacement of the curtains.

Another advantage is that health care personnel will not need to crimp the hooks.

Another advantage is removal and disposal of the curtains on a regular basis.

Accordingly various embodiments of the invention disclosed include:

An attachment for a curtain system having a hook on a track attached to a ceiling, wherein said hook having:

a first end affixed to a sliding member, wherein the sliding member slides along the track;

a shank extending from the sliding member;

a bend extending from the shank, wherein the a curtain hangs from the bend by gravity when in use; and a point extending from the bend, wherein said covering comprising;

a cover having a first section covering a point, a second section of the cover, covering at least a portion of a shank, and a third section of the cover, covering a portion of a gap between the shank and the point.

Also disclosed are various embodiments of methods wherein the method includes:

A method for holding a curtain system to a hook in a track in a ceiling, wherein said curtain system having a hook on a track attached to a ceiling, wherein said hook having:

a first end affixed to a sliding member, wherein the sliding member slides along the track;

a shank extending from the sliding member;

a bend extending from the shank, wherein the a curtain hangs from the bend by gravity when in use; and a point extending from the bend, wherein said method comprising;

providing a covering;

covering a point, at least a portion of a shank, and a portion of a gap between the shank and the point with said covering; and attaching the curtain system to the covering.

BRIEF DESCRIPTION

Some of the embodiments will be described in detail, with reference to the following figures, wherein like designations denote like members, wherein:

FIG. 2 shows a track and hook system with covering according to an embodiment of the invention;

FIG. 3 shows a roller hook;

FIG. 4 shows a hook and covering;

FIG. 5A shows an covering being inserted onto a hook in a first position;

FIG. 5B shows an covering being inserted onto a hook in a second position;

FIG. 5C shows an covering being inserted onto a hook in a third position;

FIG. 6 shows another embodiment of the invention;

FIG. 7 shows a further embodiment of the invention;

DETAILED DESCRIPTION

Figure 1:
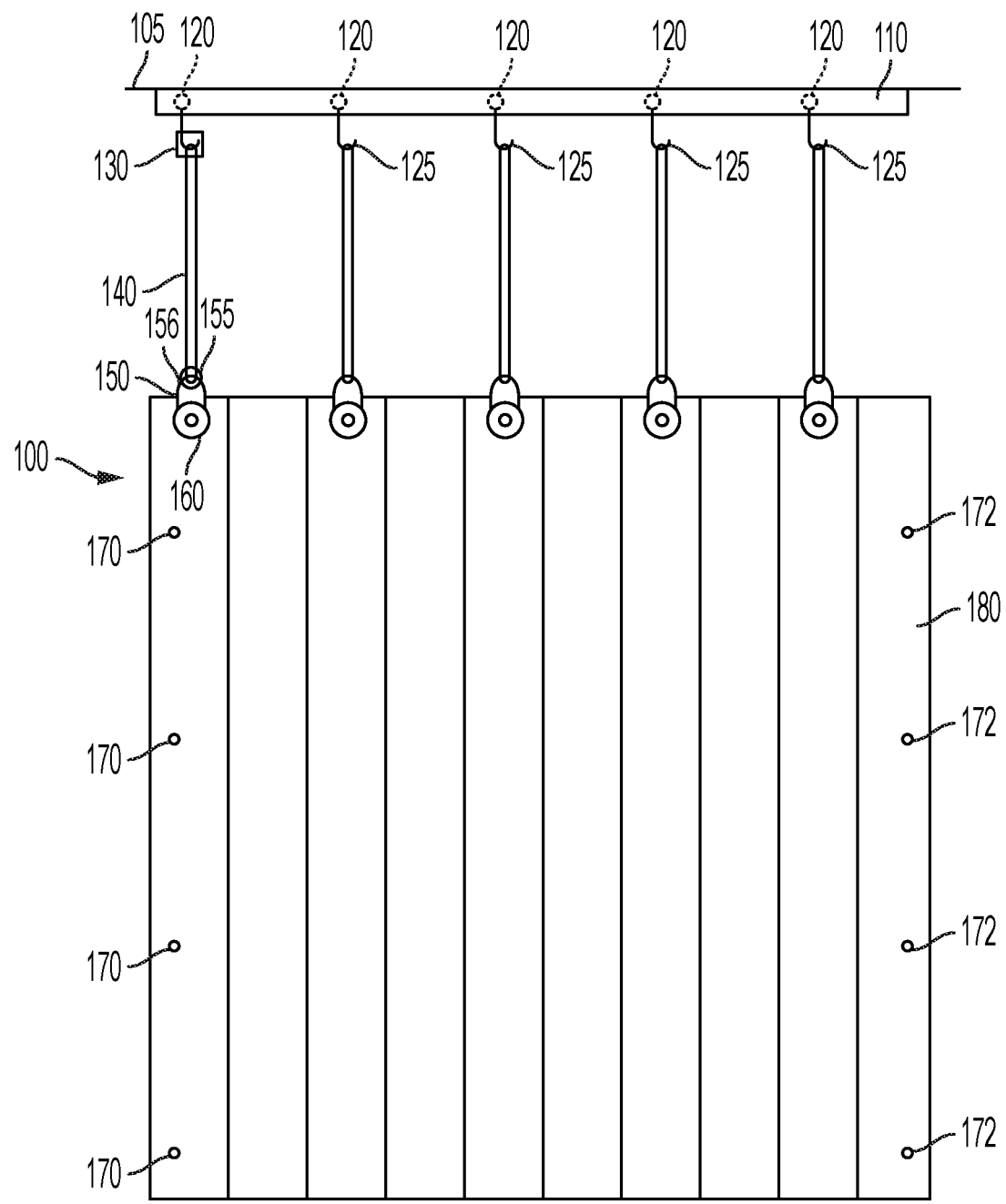
FIG. 1 shows a curtain system according to an embodiment of the invention.

Disclosed are various embodiments of the inventions. Referring to FIG. 1 is a disposable curtain system 100. The disposable curtain system 100 is attached to the ceiling 105 by a track 110. The track may be attached directly to the ceiling or hang from the ceiling on extensions. Running through the track 110 are roller hooks 120. The roller hooks 120 have a hook 125 on the end thereof for attaching an extension 140. So that the extension does not come of the hook 125 a cover for the hook 130 is provided.

The extension 140 may be telescoping poles, poles that may be discreet sizes and interchanged depending on size needed, straps 139, which may include a buckle that may be adjusted for size or the strap may be cut, a string or wire that may be adjusted or cut. Since the extension will remain in place it is important that is easily cleanable for infectious diseases with an extension pole that has disinfectant. The material of the extension should not be absorb liquids, but should be made from a plastic such as PVC, polyethylene or the like.

On the opposite end of the extension is a quick connect and/or release system 150. At the end of the extension is a nob or holder 155 in which a wire or string 156 may be inserted for holding the curtain covering 160 in place. The curtain holder has a button or dial. Inside the curtain holder, first side of the string or wire 156 is held permanently attached. When the quick connect and/or release system 150 is pushed together, the buttons 165 engage and release the second side of the string or wire 156 so that the curtains may be removed. The second side of the string is held in place by friction or a spring-loaded lock. Alternatively, a button may be used to release the second side of the string or wire 156 when it is rotated.

The curtain 180 comes in discreet sections, such as 6-12 feet and most commonly 9 feet. The curtain sections may be snapped together with snaps 170, 172.

Referring to FIG. 2, a track 110 is shown. The track is bolted, screwed, glued or otherwise attached to the ceiling. The track may also be on a hanging system and hang from the ceiling. The track 110 has an end piece 115 with snap connectors 116 for the end piece. Running inside the track are roller hooks 120 having rollers 122. Additionally, other types of arrangements other than rollers 122 may be used so long as they slide easily along the track guides 118. The rollers 122 and other types of arrangements disclosed herein may also be referred to as sliding member(s). Extending from the rollers are an eyelet 123 to which the eyelet of the hook 124 is attached. Other arrangements may be envisioned such as chains and other extenders for the roller hook. Over each hook, a covering 130 is affixed for quickly attaching the attachment 130 to the hook 125.

Shown in FIG. 3 is a roller hook 120 having rollers 122. The eyelet 123 for the roller hook attaches to the eyelet 124 for the hook.

FIG. 4 shows a hook 125 and attachment 130. The hook 125 is attached to the eyelet 123 for the roller hook. 120. The hook 125 has a shank 126, a bend 127 and a point 128. The area between the shank 126 and the point is the gap 129. The hook 125 can be inserted into the attachment 130 having a covering 133 through an slot or opening 131 in the covering 133 at the first end 137. At the second end 138 of the covering 133 is an attachment section 132 for attaching the extension 140 or 139. In FIG. 4 is shown a strap made of durable strong polymer material for holding onto the attachment section 132. The attachment section 132 can be a loop, eyelet or other piece that is integral or separable from the covering 133. The attachment can be made various ways including milling, injection molded plastics or the like. Inside the attachment is device to hold the attachment to the hook such as a ramped nob, a pin, or other insert. The ramped nob 134 may include slots 136 and 137. The attachment 130 has a cover or covering 133 having a first section 143 covering a point, a second section 144 of the cover, covering at least a portion of a shank, and a third section 146 of the cover, covering a portion of a gap between the shank and the point.

Referring to FIGS. 5A-5B is shown the process for inserting the hook 135 into the attachment 130. Attachment 130 is a cutaway of lines 5-5 in FIG. 4. In FIG. 5A, the hook 125 is inserted into the slot 131. In FIG. 5B, the hook 125 engages and slides over the ramped nob 134. In FIG. 5C, the hook clicks into place.

FIG. 6 shows an alternate embodiment wherein a grommet 230 may be slid between the point 128 and the shank 126 into the gap 129 of the hook 125. The grommet 230 is held in place by the spring force of the hook 125. Extension 140 has a loop 141 that slides over the point 128 and rests in the bend 127.

FIG. 7 shows a further embodiment attachment 330. The attachment has two covering pieces 336 and 337 may be referred to as the first part 336 and second part 337 that are hinged together by hinge 335. The covering pieces 336 and 337 snap together with clips 333 and 334. The covering pieces 336 and 337 slightly go around the bend 127 of the hook 125 to hold the attachment 330 in place. An opening or gap 339 is at the bottom of the attachment 330 to allow the extension 140 to freely slide.

Figure 8A:
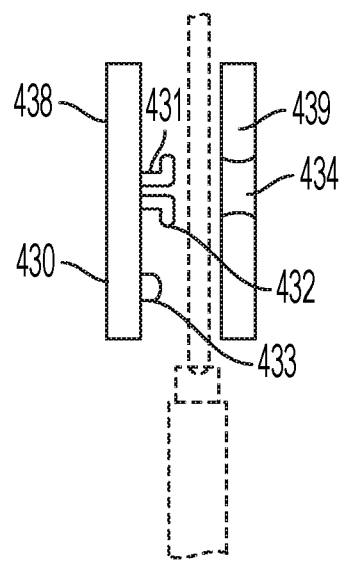
FIG. 8A shows a further embodiment of the invention.
Figure 8B:
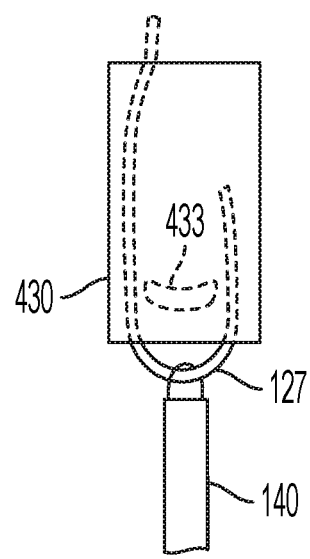
FIG. 8B shows a further embodiment of the invention.

FIGS. 8A and 8B show an alternate embodiment. In this embodiment an attachment 430 is shown have a covering with a female side 439 and a covering with a male side 438. The male side has clips 431 and 432 which insert into a hole 434. When clipped together a securement or holding member 433 such as a nob, pin, clip, cotter pin that engages the hook to prevent it from sliding.

Figure 9:
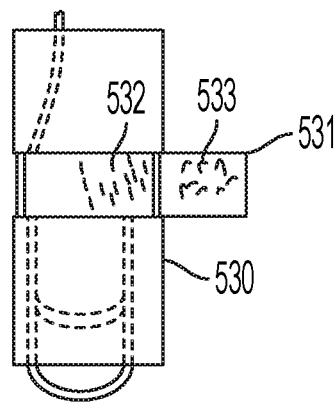
FIG. 9 shows a further embodiment of the invention.

FIG. 9 shows an alternate embodiment attachment 530 that has coverings held together by hook and loop fastener strap 531. 532 shows a section that is loops which fastens to a loop section 533 of a strap 531.

Figure 10:
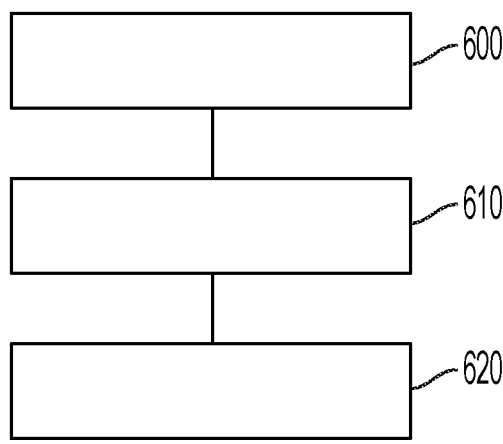
FIG. 10 shows a flow chart of a method.

FIG. 10 shows a method which includes the step of providing 600 a covering as shown in any of the embodiments of FIGS. 4-9. Covering a point 610, at least a portion of a shank, and a portion of a gap between the shank and the point with said covering. Attaching 620 the curtain system to the covering.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

PARTS LIST 100 disposable curtain system
105 ceiling
110 track
115 end piece for roller track
116 snap connectors for end piece
120 roller hook
122 rollers
123 eyelet for roller hook
124 eyelet for hook
125 hook
126 shank 127 bend
128 point
129 gap
130 cover for hook
131 hook opening
132 attachment section
139 strap
140 extension
150 quick connect/release system
160 curtain attachment for quick connect/release system
165 release for quick connect/release system
170 first attachment for additional curtains
172 second attachment for additional curtains
180 curtains

What is claimed is:

1. An attachment for a curtain system having a hook on a track, wherein said hook having:
 a first end affixed to a sliding member, wherein the sliding member slides along the track;
 a shank extending from the sliding member;
 a bend extending from the shank, wherein a curtain hangs from the bend by gravity when in use; and
 a point extending from the bend, wherein said attachment comprising;
  a cover having a first section covering a portion of the hook between the bend and the point,
  a second section of the cover, covering at least a portion of the shank, and
  a third section of the cover, covering a portion of a gap between the shank and the point, wherein the cover does not cover the bend below the cover.

2. The attachment of claim 1, wherein the curtain or a curtain attachment may hang from the bend and the cover does not permit the curtain or the curtain attachment to be removed from the hook while the cover is in place.

3. The attachment of claim 1, wherein the cover has first section with a female receiving opening and a second section with a male section for at least one of clipping, snapping or inserting into the female receiving section.

4. The attachment of claim 1, wherein the cover is hinged.

5. The attachment of claim 1, wherein the cover is a grommet that is inserted by sliding the grommet between the shank and the point.

6. The attachment of claim 1, wherein the cover has an attachment section extending therefrom for attaching an extension for a curtain or curtain attachment thereto.

7. The attachment of claim 6, wherein the attachment section is at least one of a loop, a clip, a snap, hook and loop fastener, a pin, an opening and an eyelet.

8. The attachment of claim 1, wherein the cover covers the entire bend and the point and the portion of the shank.

9. The attachment of claim 1, wherein the cover has a first end defining a slot therein for receiving the bend of the hook and sliding over the hook, a securement for the cover from sliding off the hook.

10. The attachment of claim 9, wherein the securement is at least one of a pin or clip that slides through an opening in the cover.

11. The attachment of claim 9, wherein the securement is a ramped nob within the cover and the hook slides over and snaps into place.

12. The attachment of claim 9, wherein the cover has a first part and a second part with the securement within the gap of the hook.

13. A method for holding a curtain system to a hook in a track, wherein said curtain system having a hook on a track attached to a ceiling, wherein said hook having:
 a first end affixed to a sliding member, wherein the sliding member slides along the track;
 a shank extending from the sliding member;
 a bend extending from the shank, wherein the curtain hangs from the bend by gravity when in use; and
 a point extending from the bend, wherein said method comprising;
  providing a covering;
  covering at least a portion of the shank, and a portion of a gap between the shank and the point with said covering, wherein the covering does not cover a bottom of the bend; and
  attaching the curtain system to the covering.

14. A curtain system having a hook on a track, wherein said hook having:
 a first end affixed to a sliding member, wherein the sliding member slides along the track;
 a shank extending from the sliding member;
 a bend extending from the shank, wherein a curtain hangs from the bend by gravity when in use; and
 a point extending from the bend, wherein said curtain system having an attachment comprising;
  a cover having a first section covering a portion of the hook between the bend and the point, wherein a portion of the bend below the cover is not covered,
  a second section of the cover, covering at least a portion of the shank, and
  a third section of the cover, covering a portion of a gap between the shank and the point.

15. The attachment of claim 14, wherein the cover does not cover the entire bend such that a curtain or curtain attachment may hang from the bend and the cover does not permit the curtain or curtain attachment to be removed from the hook while the cover is in place.

16. The attachment of claim 14, wherein the cover has first section with a female receiving opening and a second section with a male section for at least one of clipping, snapping or inserting into the female receiving section.

17. The attachment of claim 14, wherein the cover is a grommet that is inserted by sliding the grommet between the shank and the point.

18. The attachment of claim 14, wherein the cover has an attachment section extending therefrom for attaching an extension for a curtain or curtain attachment thereto.

19. The attachment of claim 18, wherein the attachment section is at least one of a loop, a clip, a snap, hook and loop fastener, a pin, an opening and an eyelet.

20. The attachment of claim 14, wherein the cover covers the entire bend and the point and the portion of the shank.

* * * * *